Sept. 28, 1943.   L. H. MATTHIAS   2,330,505
ELECTRIC CONTROL CIRCUIT
Filed March 10, 1941   2 Sheets-Sheet 1

INVENTOR
LYNN H. MATTHIAS
BY Walter S. Pfeifer
ATTORNEY

Sept. 28, 1943.                L. H. MATTHIAS                 2,330,505
                          ELECTRIC CONTROL CIRCUIT
                          Filed March 10, 1941           2 Sheets-Sheet 2

INVENTOR
LYNN H. MATTHIAS
BY *Walter S. Pfeifer*
ATTORNEY

Patented Sept. 28, 1943

2,330,505

UNITED STATES PATENT OFFICE 2,330,505

ELECTRIC CONTROL CIRCUIT

Lynn H. Matthias, Fox Point, Wis., assignor to Allen-Bradley Company, Milwaukee, Wis., a corporation of Wisconsin Application March 10, 1941, Serial No. 382,510

9 Claims. (Cl. 175—375)

This invention relates to control circuits employing a relay or contactor having two operating positions and two electroresponsive means to operate the device to either of the two positions.

The object of the invention is to secure an improved system of control applicable to a wide variety of two-position relays that have electroresponsive means to move to one position of operation and electro-responsive means to move to a second position of operation.

A further object of the invention is to secure a system of control for a relay of this type in which the electro-responsive means operable to move the relay to a second position is connected to a source of power when the relay is in the first position and restrained from operating by a control circuit shunted around the electroresponsive means, which circuit when interrupted permits effective energization of the electroresponsive means and movement of the relay to the second position.

A further object of this invention is to secure a system of control for relays of the type employing residual magnetic means to lock the relay in one position and to return the relay to a second position by predetermined energization of an electro-responsive means, which energization is controlled by interruption of a shunt circuit.

A further object of this invention is to secure a system of control for relays of this type that can be used with either a two-wire or three-wire pilot control circuit in which the pilot control circuit is employed as a shunt connection around one electro-responsive element of the relay preventing effective energization and operation thereof until after the pilot circuit is opened.

Two-position relays or contactors employing individual electro-responsive means to move to either of two positions have heretofore been controlled by energizing the proper electro-responsive means at the time movement of the relay to a given position is desired. This system of control is disadvantageous when employed with conventional "start" and "stop" stations because it is necessary to have the "stop" switch make contact to move the relay to "stop" or "off" position.

In the design of control circuits, the preferred practice is to have the "stop" switch break contact to actuate the relay to "stop" or "off" position. The control circuit herein disclosed permits operation of a relay of the type disclosed by means of the conventional "start" and "stop" control stations in which the movement of the relay to the "start" position is made by making contact with the "start" switch completing a circuit through the "stop" switch to move the relay to the "start" position. Movement of the relay to the "start" position operates a lock-in contact around the "start" switch to maintain the circuit independent of the "start" switch. The maintained circuit established through the "stop" switch and lock-in contact serves as a shunt circuit around the electro-responsive means of the relay which is responsive when effectively energized to move to the "off" position upon interruption of the maintained circuit by operation of the "stop" switch.

There herein disclosed system of control can also be used with a two-wire pilot control by using the pilot circuit in the "on" position to move the relay to "on" position and as the maintained shunt circuit, which when interrupted initiates movement of the relay to "off" position.

A control circuit illustrative of the invention is shown in Figure 1.

Figure 1:
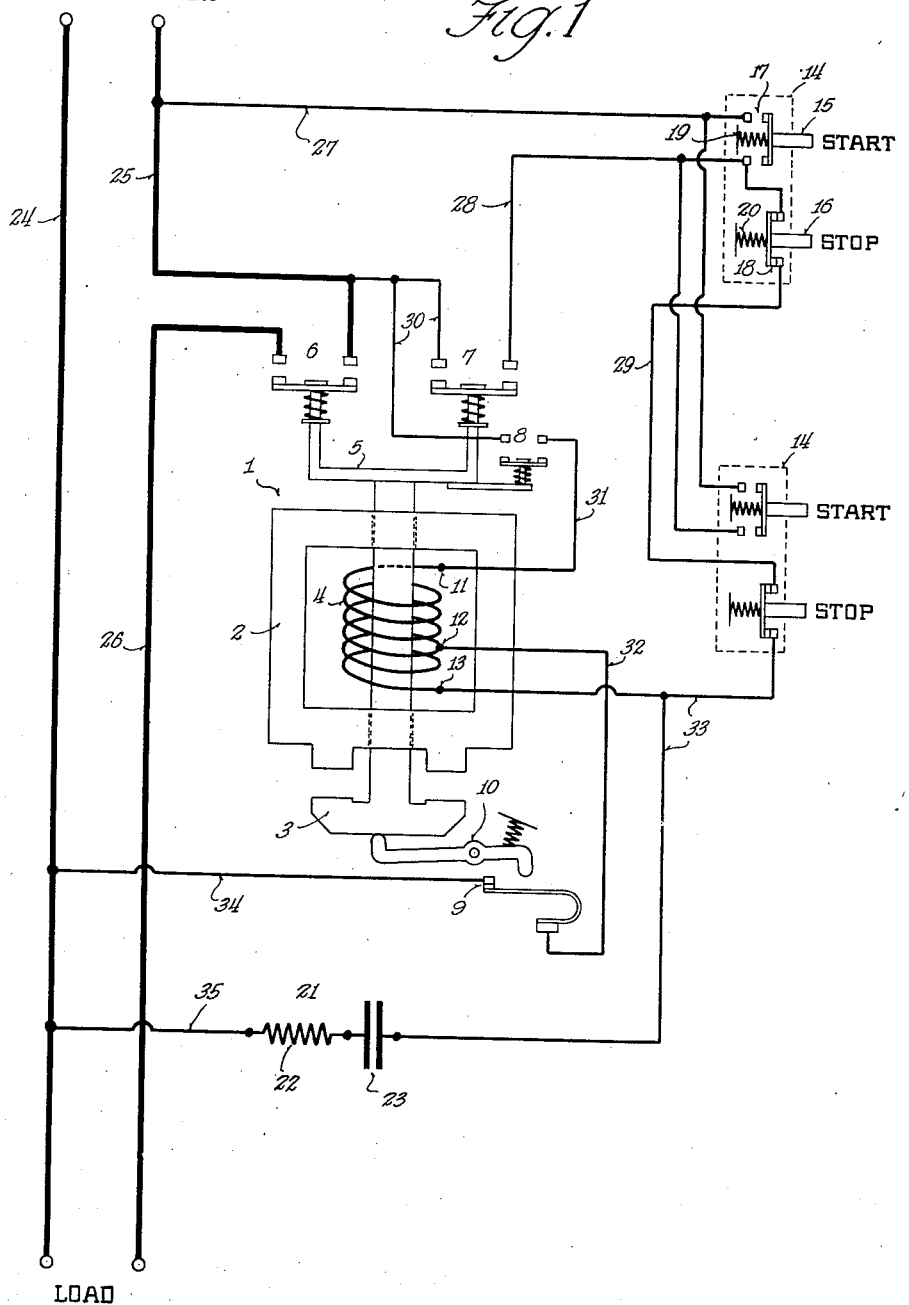

The preferred form of the invention shown in Figure 1 is an electric control circuit operable from one or more start and stop control stations 14 to connect a source of alternating current power to an electric load. The control circuit includes a two-position relay 1 and impedance 21 and two control stations 14.

The two position relay 1 shown in the preferred form, is a relay of the type disclosed in the pending application of Gustav O. Wilms and Albert J. Dawe for "Electromagnetically operated devices," Serial Number 315,040, filed January 22, 1940. This patent application is now Patent No. 2,297,339, which issued on September 29, 1942. This relay is operated by an electric magnet which is magnetized by alternating current to cause the armature to move to its engaged position with the fieldpiece and to be retained therein solely by residual magnetism. Thereafter the armature may be returned to its open position through demagnetization by alternating current. This relay includes a fieldpiece 2 and cooperating armature 3 that is moved to closed or open positions by means of switch coil 4. The movement of the armature 3 to either open or closed positions operates switches 6, 7, 8 and 9. Switches 6, 7 and 8 are operated by the switch actuator assembly 5 attached to the top of the armature 3. Switch 9 is operated by the spring biased lever mechanism 10 coupled to the bottom of armature 3.

In the normal or open position shown in Figure 1, switches 6, 7 and 8 are open and are designated "normally open," switch 9 is closed and is designated "normally closed." When the armature 3 moves to the closed position, switches 6 and 7 close before switch 8 closes and switch 9 opens. This is obtained by properly spacing the contacts as shown in Figure 1.

The two-position relay 1 is held in the open position by the weight of the armature 3 and attached parts. Movement of the armature 3 to the closed position is obtained by energizing the portion of the switch coil 4 between terminals 12 and 13. As the armature 3 engages fieldpiece 2, the energized portion of the coil 4 is de-energized by the opening of switch 9 and the armature 3 remains in engagement with fieldpiece 2 by virtue of the residual magnetism remaining in the magnetic circuit. The two-position relay 1 is moved from the closed position to the open position by energizing the entire switch coil 4 with a demagnetizing force just sufficient to reduce the residual magnetism in the magnetic circuit to a value that will allow armature 3 to drop to the open position.

One or more control stations 14 can be used to operate the two-position relay 1 to connect the load to the source. Each control station 14 is identically the same and each includes a start means 15 and a stop means 16. The start means 15 consists of a normally open switch 17 held in the open position by means of spring 19. Upon compression of spring 19, switch 17 is moved to the closed position. The stop means 16 includes a normally closed switch 18 maintained in the closed position by means of spring 20. Upon operation of the stop means 16, spring 20 is compressed and the normally open switch 18 moves to the open position.

The connection of the source of alternating current power to the load is made by conductor 24, conductor 25, switch 6 in its closed position and conductor 26. Upon operation of either of the start means 15, a circuit is completed from conductor 25 through conductor 27, through switch 17 in its closed position, through a portion of conductor 28, through a normally closed switch 18, through conductor 29, through a second normally closed switch 18, through a portion of conductor 33, through the portion of coil 4 connected between terminals 13 and 12, through conductor 32, through normally closed switch 9 and through conductor 34 to conductor 24. The energization of the portion of the coil 4 between terminals 13 and 12 operates the two-position relay to the closed position connecting the load to the source of power.

The operation of the two-position relay 1 to its closed position, closes switch 7 which provides a lock-in circuit for the normally open start switch 17 assuring completion of the closing operation and maintaining a shunt circuit around the entire coil 4. This circuit includes a portion of conductor 30, switch 7 in its closed position, a portion of conductor 28, a normally closed switch 18, conductor 29, a second normally closed switch 18 and conductor 33.

Upon operation of the two-position relay to its closed position, the circuit through that portion of coil 4 between terminals 12 and 13 becomes de-energized by the opening of switch 9. The closing of switch 8 completes a circuit from conductor 25, through a portion of conductor 30, through switch 8 in its closed position, through conductor 31, through the entire coil 4, through a portion of conductor 33, through condenser 23, through resistor 22 and through conductor 35 to conductor 24 thus connecting coil 4 to the source of alternating current power. The effective energization of coil 4 is prevented by the maintained shunt circuit extending from conductor 25 to terminal 13 of coil 4. Upon interruption of the shunt circuit by operation of either stop means 16, coil 4 becomes effectively energized moving the two-position relay to its open position to disconnect the load from the source.

Figure 2:
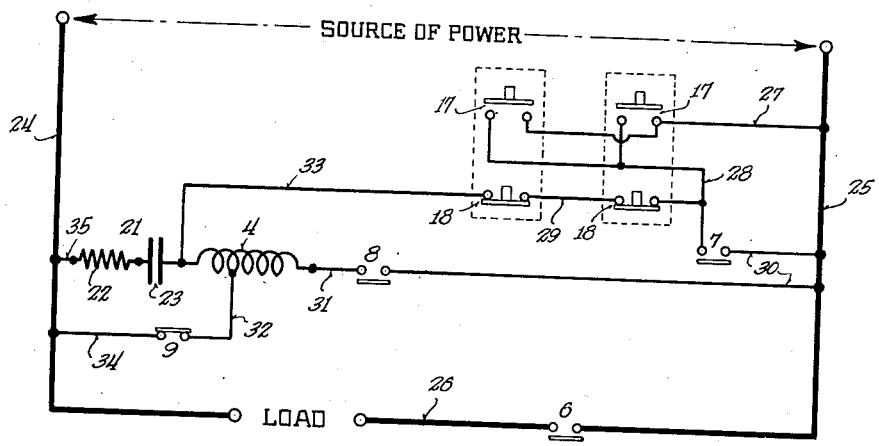
Figure 2 is a line diagram showing the circuit connections of the control system shown in Figure 1.

The operation of the control circuit herein described is shown in simplified form in Figure 2. This figure is a line drawing showing the essential circuit elements contained in Figure 1. The circuit elements are arranged in more simplified form showing clearly the part played by the shunt circuit around coil 4. In the operation of an electric control circuit of this type, the impedance 21 can, if need be, consist of either resistance, inductance or capacitance, or any combination thereof. In the preferred form, adapted to alternating current, it has been found advisable to construct the impedance 21 of both resistance and capacitance.

The reactance of condenser 23 is made equal to the reactance of the entire coil 4 so that with the shunt circuit closed a minimum current flows through condenser 23 and upon opening of the shunt circuit maximum current flows through coil 4. The resistance 22 is of such value as is necessary to secure the correct current flow through coil 4, to provide a current limiting resistor for the shunt circuit in the event of failure of condenser 23, and to limit the transient current that occurs upon interruption of switch 8.

Figure 3:
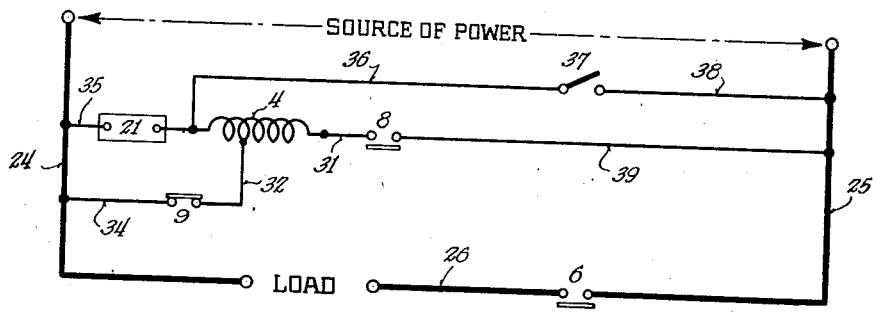
Figure 3 is a line diagram showing in simplified form the same basic circuit elements shown in Figure 1 adapted for two-wire control.

The more general form of the invention herein disclosed is adaptable for either direct or alternating current and is shown by means of a line diagram in Figure 3. In this figure the impedance 21 is shown in place of the specific showing of resistance 22 and capacitance 23. The shunt circuit shown in Figures 1 and 2 consisting of two start and stop control stations 14 and lock-in contact 7 is replaced by an equivalent shunt circuit consisting of a two-wire pilot control circuit including conductor 36, switch 37 and conductor 38. This circuit upon closure of switch 37 energizes a portion of coil 4 to operate the relay to "on" position and provides a shunt circuit extending around coil 4, which circuit upon interruption allows coil 4 to be effectively energized to move the relay to the "off" position.

The two-position relay 1 has two effectively independent electro-responsive means, one responsive upon proper energization to move the relay to "on" position, and the other responsive upon proper energization to effect movement of the relay to "off" position. In order to adapt this relay to the preferred method of control, the circuit is arranged so that when the relay is in the "start" or "on" position the "off" means of the relay is connected to the source of power and prevented from effective energization by a shunt circuit around the electro-responsive "off" means. The control circuit for the relay is either a two-wire pilot control circuit or a "start" and "stop" control circuit and a lock-in contact operated by the relay, operative upon closure to energize the electro-responsive "on" means of the relay and after closure functioning as the shunt circuit, which circuit upon interruption permits effective energization of the "off" means of the relay and operation thereof to the "off" position.

What I claim as my invention is:

1. An electric control circuit comprising, a source of electric power, an electric load, a two-position relay having electro-responsive means to move it to "on" position to connect the load to the source, electro-responsive means to move it to "off" position to disconnect the load from the source and means independent of continuous energization of either electro-responsive means to hold the relay in either "on" or "off" position, circuit means including an impedance to connect the "off" means of the relay to the source of power when the relay is in the "on" position, and a control connection, when closed, energizing the "on" means of the relay moving it to "on" position and completing a shunt circuit around the "off" means of the relay preventing effective energization and operation thereof to the "off" position until after the control connection is opened.

2. An electric control circuit comprising, a source of electric power, an electric load, a two-position relay having electro-responsive means to move it to "on" position to connect the load to the source, electro-responsive means to move it to "off" position to disconnect the load from the source and means independent of continuous energization of either electro-responsive means to hold the relay in either "on" or "off" position, circuit means to connect the "off" means of the relay to the source of power when the relay is in the "on" position, a second circuit connecting means providing a connection for the "on" means to the source of power when the relay is in the "off" position and interrupting said second connection when the relay moves to the "on" position, a control connection, when closed, cooperating with the second circuit connecting means to energize the "on" means of the relay moving it to "on" position, and said control connection completing a shunt circuit around the "off" means of the relay preventing effective energization and operation thereof to the "off" position until after the control connection is opened.

3. An electric control circuit comprising, a source of electric power, an electric load, a two-position relay having electro-responsive means to move it to "on" position to connect the load to the source, electro-responsive means to move it to "off" position to disconnect the load from the source and means independent of continuous energization of either electro-responsive means to hold the relay in either "on" or "off" position, circuit means including an impedance to connect the "off" means of the relay to the source of power when the relay is in the "on" position, a second circuit connecting means providing a connection for the "on" means to the source of power when the relay is in the "off" position and interrupting said second connection when the relay moves to the "on" position, a control connection, when closed, cooperating with the second circuit connecting means to energize the "on" means of the relay moving it to "on" position, and said control connection completing a shunt circuit around the "off" means of the relay preventing effective energization and operation thereof to the "off" position until after the control connection is opened.

4. An electric control circuit comprising, a source of electric power, an electric load, a two-position relay having electro-responsive means to move it to "on" position to connect the load to the source, electro-responsive means to move it to "off" position to disconnect the load from the source and residual magnetic means to maintain the relay in "on" position upon operation thereto, circuit means to connect the "off" means of the relay to the source of power when the relay is in the "on" position, a second circuit connecting means providing a connection for the "on" means to the source of power when the relay is in the "off" position and interrupting said second connection when the relay moves to the "on" position, a control connection, when closed, cooperating with the second circuit connecting means to energize the "on" means and to move the relay to "on" position, said relay being maintained in the "on" position by the residual magnetic means, and said control connection completing a shunt circuit around the "off" means of the relay preventing effective energization and operation thereof to the "off" position until after the control connection is opened.

5. An electric control circuit comprising, a source of electric power, an electric load, a two-position relay having electro-responsive means to move it to "on" position to connect the load to the source, electro-responsive means to move it to "off" position to disconnect the load from the source and residual magnetic means to maintain the relay in "on" position upon operation thereto, circuit means including an impedance to connect the "off" means of the relay to the source of power when the relay is in the "on" position, a second circuit connecting means providing a connection for the "on" means to the source of power when the relay is in the "off" position and interrupting said second connection when the relay moves to the "on" position, a control connection, when closed, cooperating with the second circuit connecting means to energize the "on" means and to move the relay to "on" position, said relay being maintained in the "on" position by the residual magnetic means, and said control connection completing a shunt circuit around the "off" means of the relay preventing effective energization and operation thereof to the "off" position until after the control connection is opened.

6. An electric control circuit comprising, a source of electric power, an electric load, a two-position relay having electro-responsive means to move it to "on" position to connect the load to the source, residual magnetic means to maintain the relay in "on" position upon operation thereto, electro-responsive "off" means to release the residual magnetic means to initiate return of the relay to "off" position to disconnect the load from the source and biasing means to return the relay to "off" position upon release of said residual magnetic means, circuit means including an impedance to connect the "off" means of the relay to the source of power when the relay is in the "on" position, a second circuit connecting means providing a connection for the "on" means to the source of power when the relay is in the "off" position and interrupting said second connection when the relay moves to the "on" position, a control connection, when closed, cooperating with the second circuit connecting means to energize the "on" means and to move the relay to "on" position, said relay being maintained in the "on" position by the residual magnetic means, and said control connection completing a shunt circuit around the "off" means of the relay preventing effective energization of the "off" means, whereby, the release of the residual magnetic means and return to the "off" position is controlled by interruption of the control connection.

7. An electric control circuit comprising, a source of electric power, an electric load, a two-position relay having electro-responsive means to move it to "on" position to connect the load to the source, electro-responsive means to move it to "off" position to disconnect the load from the source and residual magnetic means to maintain the relay in "on" position upon operation thereto, circuit means including an impedance to connect the "off" means of the relay to the source of power when the relay is in the "on" position, and a control connection, when closed, energizing the "on" means of the relay moving it to "on" position and completing a shunt circuit around the "off" means of the relay preventing effective energization and operation thereof to the "off" position until after the control connection is opened.

8. An electric control apparatus comprising an electric magnet having an armature movable between an "on" position and an "off" position, a first electric responsive means to move the armature to the "on" position, a retaining means to keep the armature in the "on" position with said first electric responsive means inoperative, a second electric responsive means to make inoperative said retaining means to cause said armature to move to "off" position, switch means operated by the armature in movement to "on" position to complete a circuit to energize said second electric responsive means and a second switch means operated by the armature in movement to "on" position to complete a shunt circuit around said second electric responsive means and thereby prevent operation of the armature to the "off" position until after the shunt circuit is interrupted.

9. An electric control apparatus comprising an electric magnet having an armature movable between an "on" position and an "off" position, a first electric responsive means to move the armature to the "on" position, said magnet capable of residual magnetism derived from the first electric responsive means to keep the armature in the "on" position with said first electric responsive means inoperative and a second electric responsive means to neutralize said residual magnetism to cause said armature to move to "off" position and switch means operated by the armature in movement to "on" position to complete a circuit to energize said second electric responsive means and a second switch means operated by the armature in movement to "on" position to complete a shunt circuit around said second electric responsive means and thereby prevent operation of the control apparatus to the "off" position until after the shunt circuit is interrupted.

LYNN H. MATTHIAS.